United States Patent
Pierre et al.

(10) Patent No.: US 6,678,463 B1
(45) Date of Patent: Jan. 13, 2004

(54) SYSTEM AND METHOD FOR INCORPORATING PREVIOUSLY BROADCAST CONTENT INTO PROGRAM RECORDING

(75) Inventors: Ludovic Pierre, San Francisco, CA (US); Debra Hensgen, Palo Alto, CA (US)

(73) Assignee: OpenTV, San Francisco, CA (US)

(*) Notice: Subject to any disclaimer, the term of this patent is extended or adjusted under 35 U.S.C. 154(b) by 0 days.

(21) Appl. No.: 09/630,646

(22) Filed: Aug. 2, 2000

(51) Int. Cl.[7] .................................................. H04N 5/91
(52) U.S. Cl. ........................ 386/83; 386/112; 386/125
(58) Field of Search .......................... 386/46, 83, 109, 386/112, 125, 126; 360/5; 369/30; 380/211

(56) References Cited

U.S. PATENT DOCUMENTS

| | | | | |
|---|---|---|---|---|
| 4,982,390 A | * | 1/1991 | Tanaka ........................ | 369/30 |
| 5,282,092 A | * | 1/1994 | Wilhelms ....................... | 360/5 |
| 5,381,275 A | * | 1/1995 | Nitta et al. ................... | 386/112 |
| 5,438,423 A | * | 8/1995 | Lynch et al. ................. | 386/109 |
| 5,555,463 A | | 9/1996 | Staron ......................... | 348/560 |
| 5,640,453 A | * | 6/1997 | Schuchman et al. ........ | 380/211 |
| 5,995,705 A | * | 11/1999 | Lang ............................. | 386/46 |

FOREIGN PATENT DOCUMENTS

WO      95/32584      11/1995

* cited by examiner

*Primary Examiner*—Huy Nguyen
(74) *Attorney, Agent, or Firm*—Meyertons Hood Kivlin Kowert & Goetzel, P.C.; Rory D Rankin

(57) ABSTRACT

A method and system for incorporating previously broadcast content into a program recording. The method includes receiving a broadcast containing a program and automatically recording the broadcast at the start of the program to store a first portion of the program in a first storage area. Space is allocated within a second storage area after the start of the program upon receiving a record command from a viewer. A second portion of the program is recorded in the allocated space of the second storage area and the first and second portions of the program are combined within the second storage area to create a recording of the program.

23 Claims, 5 Drawing Sheets

SYSTEM AND METHOD FOR INCORPORATING PREVIOUSLY BROADCAST CONTENT INTO PROGRAM RECORDING

BACKGROUND OF THE INVENTION

The present invention relates generally to broadcast television systems, and more particularly, to the recording of programs and incorporation of previously broadcast content into the recording.

A broadcast service provider generates audio-video streams for transmission to a viewer's television. Interactive television systems are capable of displaying text and graphic images in addition to typical audio-video program streams and provide a number of services and interactive applications to viewers. The interactive television signal includes an interactive portion consisting of application code or system information, as well as an audio-video portion consisting of a television program. The broadcast service provider combines the audio-video and interactive portions into a single signal for transmission to a receiver connected to the viewer's television. The signal is generally compressed prior to transmission and transmitted through typical broadcast media such as cable television (CATV) lines or direct satellite transmission systems.

A set top box connected to the television controls the interactive functionality of the television. The set top box receives the signal transmitted by the broadcast service provider, separates the interactive portion from the audio-video portion, and decompresses the respective portions of the signal. The set top box uses interactive information to execute an application while the audio-video information is transmitted to the television.

Set top boxes typically include only a limited amount of memory. While this memory is sufficient to execute interactive applications, it is typically not adequate to store the applications for an indefinite period of time. Further, the memory of the set top box is typically too small to accommodate a program which includes large amounts of audio or video data, application code, or other information. Storage devices may be coupled with the set top box to provide additional memory for the storage of video and audio broadcast content.

Interactive content such as application code or information relating to television programs is typically broadcast in a repeating format. The pieces of information broadcast in this manner form what is referred to as a "carousel". Repeating transmission of objects in a carousel allows the reception of those objects by a receiver without requiring a return path from the receivers to the server. If a receiver needs a particular piece of information, it can simply wait until the next time that piece of information is broadcast, and then extract the information from the broadcast stream. If the information were not cyclically broadcast, the receiver would have to transmit a request for the information to the server, thus requiring a return path. If a viewer is initially not interested in the carousel content, but later expresses an interest, the information can be obtained the next time the carousel is broadcast.

Since broadcast networks have access only to a limited bandwidth, audio-video content is not broadcast in carousels. Thus, the set top box cannot wait to receive the rebroadcast of the audio and video content if a viewer decides to record a program after it has already started. There is also insufficient bandwidth and server resources to handle pulling of large amounts of data required for video and audio in real-time to handle near simultaneous requests for broadcast of previously broadcast material from a vast number of television viewers. Therefore, even if sufficient storage is available on the storage device, a viewer cannot decide in the middle of a program to record the entire program, since the beginning of the program has already been broadcast. Thus, a viewer who wants to record an entire program must decide to do so before broadcast of the program has started. The viewer also has to prepare the media for recording before the start of a program. This may require deleting one or more previously recorded programs or attaching an external storage device. Since the viewer has not yet seen any of the program, it may be difficult for the viewer to choose to delete one or more of the existing recordings to make space for the new program.

There is, therefore, a need for a system and method that allows a viewer to record an entire broadcast program after a portion of it has already been viewed.

SUMMARY OF THE INVENTION

A method and system for incorporating previously broadcast content into a recording of a program are disclosed. A method of the present invention generally comprises receiving a broadcast containing a program and automatically recording the broadcast at a start of the program to store a first portion of the program in a first storage area. A space within a second storage area is allocated upon receiving a record command during the recording of the first portion of the program. A second portion of the program is recorded in the allocated space in the second storage area.

The first storage area may be a circular buffer which temporarily stores the first portion of the program broadcast prior to a viewer deciding to record the program. The first and second storage area may comprise a magnetic disk, optical disk or flash memory, for example. The first and second storage areas may be located in a storage device coupled to a set top box or located internal to the set top box. If a space sufficient in size to store the entire program is available on the storage device, the space is allocated for the program. The second portion of the program is recorded in the allocated space and the first portion of the program is transferred from the circular buffer to the allocated space to create a program recording. The common storage area may be the allocated space in the second storage area, a new space within the second storage area, or a completely different storage area. If there is insufficient space to record the entire program on the storage device, a viewer of the program will be notified. The viewer may delete previously recorded material from the storage device or cancel the request for recording the current program.

A system of the present invention generally comprises a receiver operable to receive the program, a storage device coupled to the receiver, and a processor. The processor is operable to automatically control the recording of the program in order to store a first portion of the program in a first storage area, allocate space within the storage device after the start of the program, direct a second portion of the program to the allocated space of the second storage area, and combine the first and second portions of the program.

The receiver may be a set top box and the storage device may be contained within the set top box or may be a storage device externally connected to the set top box. The first storage area may be located within the set top box or the storage device.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
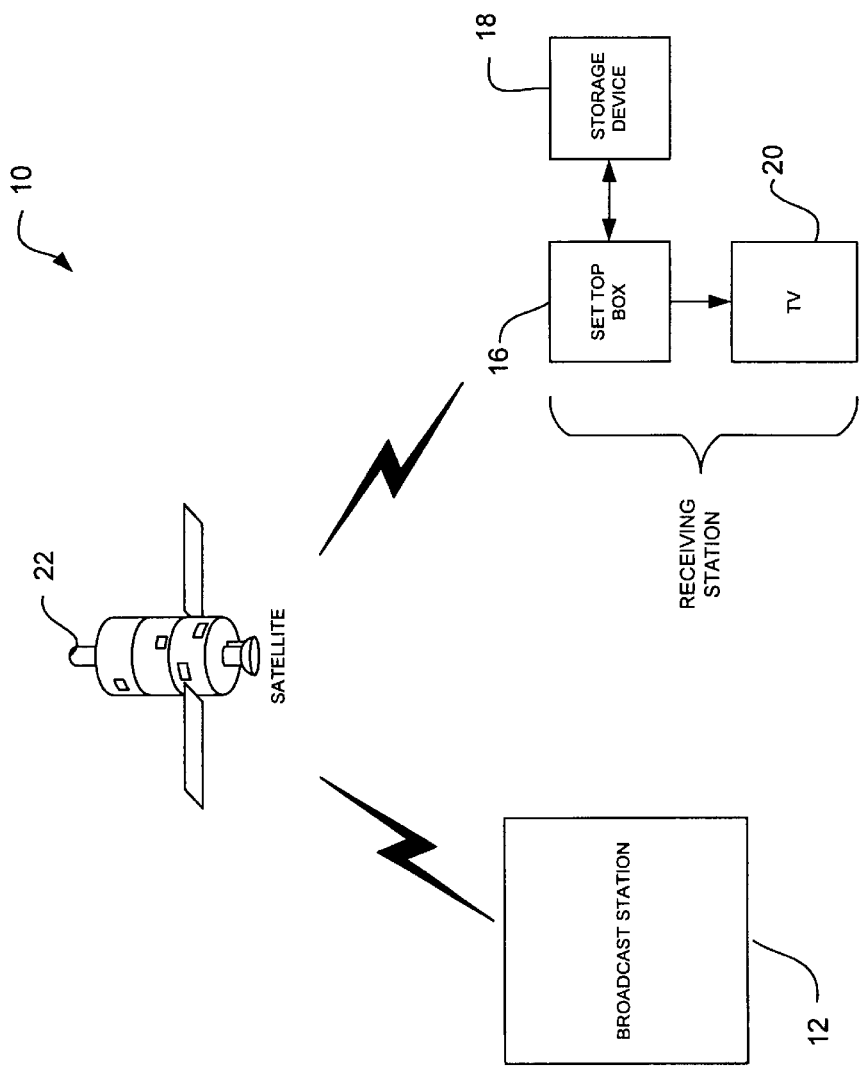
FIG. 1 is a diagram illustrating the distribution of television programs and system information from a broadcast station to a receiving station.

Referring now to the drawings, and first to FIG. 1, a diagram of a television broadcast and receiving system is shown and generally indicated at 10. The system 10 includes a broadcast station 12 where audio-video and control information is assembled in the form of digital data and mapped into digital signals for satellite transmission to a receiving station. The term broadcast as used herein may include audio information, video information, signaling information, interactive applications, or any combination thereof. Control information such as conditional access information and service information may be added to video, audio, and interactive applications for use by the interactive television system. The control information is converted by the broadcast station to a format suitable for transmission over broadcast medium. The data may be formatted into packets, for example, which can be transmitted over a digital satellite network. The packets may be multiplexed with other packets for transmission. The signal is typically compressed prior to transmission and may be transmitted through broadcast channels such as cable television lines or direct satellite transmission systems 22 (as shown in FIG. 1). Telephone lines, cellular networks, fiber optics, or other terrestrial transmission media may also be used in place of the cable or satellite system.

The receiving station includes a set top box 16 connected to a storage device 18 configured to store program data, and a television 20 which is used to present programs to a viewer. The set top box 16 is operable to decompress the digital data and display programs to a viewer. The decompressed video signals may be converted into analog signals such as NTSC (National Television Standards Committee) format signals for television display. Control signals sent to the set top box 16 are filtered and used by the processor 30 immediately or placed in local storage such as RAM. The set top box 16 may be used to overlay or combine different signals to form the desired display on the viewer's television 20.

As further described below, the set top box 16 is configured to record a program that the viewer is watching for a predetermined time or until the program has ended. This allows data that was broadcast prior to a viewer's decision to record the program to be incorporated into the program recording to provide a complete recording of the program. It is to be understood that the term "program" as used herein refers to any broadcast material including television shows, sporting events, news programs, movies, or any other type of broadcast material, or segment of the show, event, program, movie, or other material. The program may include only audio, video, data, or any combination thereof. The program may be only a portion of a television show or broadcast (e.g., without commercials, or missing a portion of the beginning or end) or may be more than one show, or include commercials, for example. Furthermore, it is to be understood that the term "viewing" as used herein is defined such that viewing of a program begins as soon as a tuner begins filtering data corresponding to a program. If a viewer has tuned to a particular frequency prior to the broadcast of a program, the beginning of the viewing preferably corresponds to the beginning of the program. The viewing preferably ends when the program is complete or when the tuner is no longer filtering the frequency corresponding to the program. Thus, the recording of a program coincides with the "viewing" of a program and the program is only recorded when the tuner is tuned to the station broadcasting the program. The television may even be turned off after a viewer has started recording the program, as long as the tuner is tuned into the station broadcasting the program.

The audio-video signals and program control signals received by the set top box 16 correspond to television programs and menu selections that the viewer may access through a viewer interface. The viewer may control the set top box 16 through an infrared remote control unit, a control panel on the set top box, or a menu displayed on the television screen, for example.

It is to be understood that the system 10 described above and shown in FIG. 1 is only one example of a system used to convey signals to the television 20. The broadcast network system may be different than described herein without departing from the scope of the invention.

The set top box 16 may be used with a satellite receiver or satellite integrated decoder receiver that is capable of decoding video, audio, and data. The set top box 16 may be configured, for example, to receive digital video channels which support broadband communications using Quadrature Amplitude Modulation (QAM) and control channels for two-way signaling and messaging. The digital QAM channels carry compressed and encoded multiprogram MPEG (Motion Picture Expert Group) transport streams. A transport system extracts the desired program from the transport stream and separates the audio, video, and data components, which are routed to an audio decoder, video decoder, and RAM, respectively. It is to be understood that the set top box 16 and storage device 18 may be analog, digital, or both analog and digital.

Figure 2:
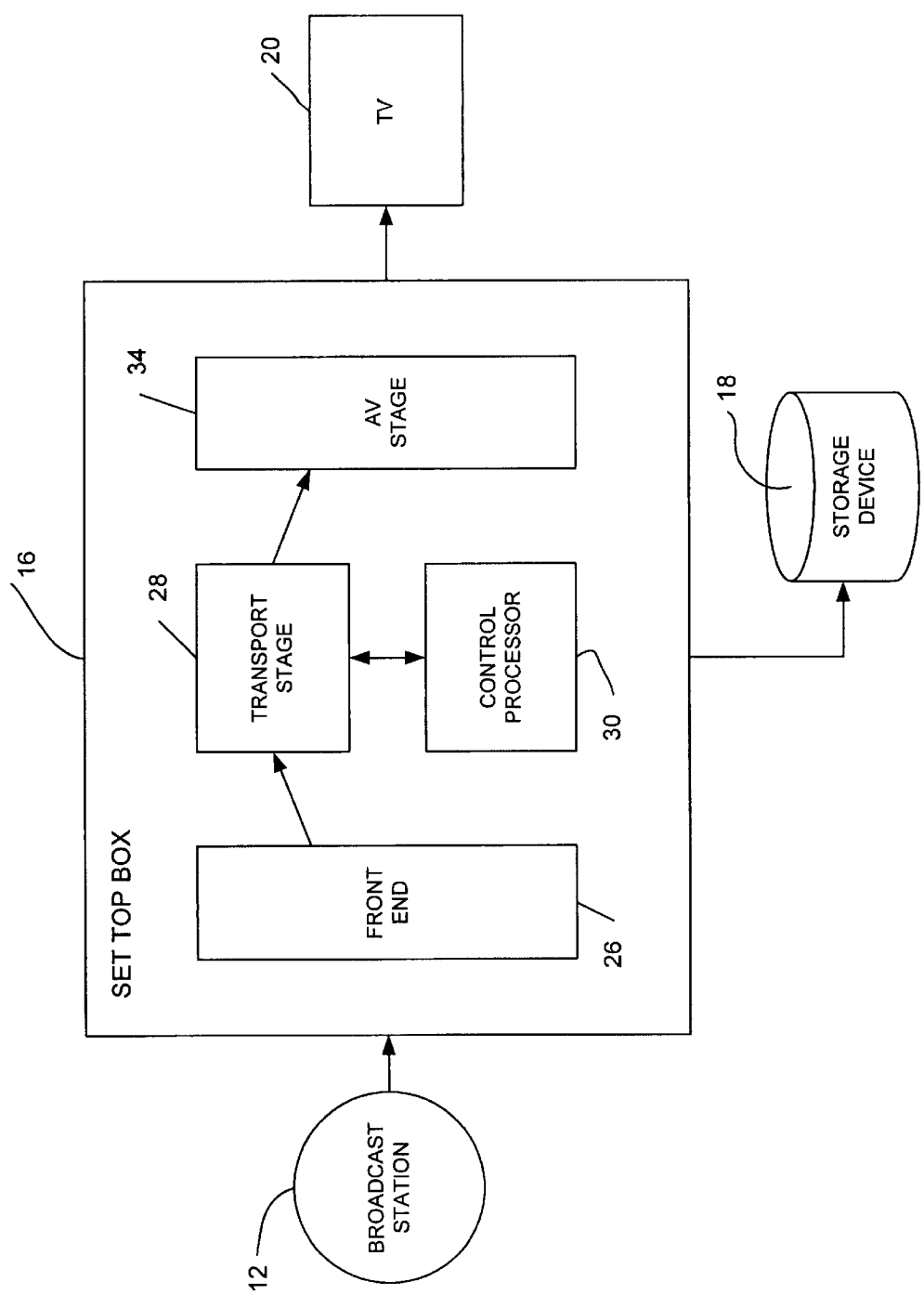
FIG. 2 is a block diagram of a system of the present invention for recording programs received from the broadcast station of FIG. 1.

As shown in FIGS. 1 and 2, the storage device 18 is coupled to the set top box 16. The storage device 18 is used to provide sufficient storage to record programs that will not fit in the limited amount of main memory (e.g., RAM) typically available in set top boxes. The storage device 18 may comprise any suitable storage device, such as a hard disk drive, a recordable DVD drive, magnetic tape, optical disk, magneto-optical disk, flash memory, or solid state memory, for example. The storage device 18 may be internal to the set top box 16 or connected externally (e.g., through an IEEE 1394–1995 connection) with either a permanent connection or a removable connection. More than one storage device 18 may be attached to the set top box 16. The set top box 16 and/or storage device 18 may also be included in one package with the television set 20.

FIG. 2 illustrates one embodiment of a system of the present invention used to record programs received from the broadcast station 12. The set top box 16 generally includes a control unit (e.g., microprocessor), main memory (e.g., RAM), and other components which are necessary to select and decode the received interactive television signal. As shown in FIG. 2, the set top box 16 includes a front end 26 operable to receive audio, video, and other data from the broadcast station 12. The broadcast source is fed into the set top box 16 at the front end 26, which comprises an analog to digital (A/D) converter and tuner/demodulators (not shown). The front end 26 filters out a particular band of frequencies, demodulates it and converts it to a digital format. The digitized output is then sent to a transport stage 28. The transport stage 28 further processes the data, sending a portion of the data to an audio-visual (AV) stage 34 for display and another portion to the control processor 30, and filtering out the rest of the data.

Control information may also be recorded as broadcast along with the audio-video data, or may be first manipulated by software within the set top box. For example, broadcast CA (conditional access) information may be used to decrypt broadcast video. The original broadcast streams, or modification of these streams may be optionally re-encrypted using a set top box key or algorithm prior to recording. The encrypted video may also be stored as received along with the broadcast CA information. Also, clock information may be translated to a virtual time system prior to recording. An MPEG-2 elementary stream may be de-multiplexed from an MPEG-2 transport stream, then encapsulated as a program stream and recorded.

Figure 3:
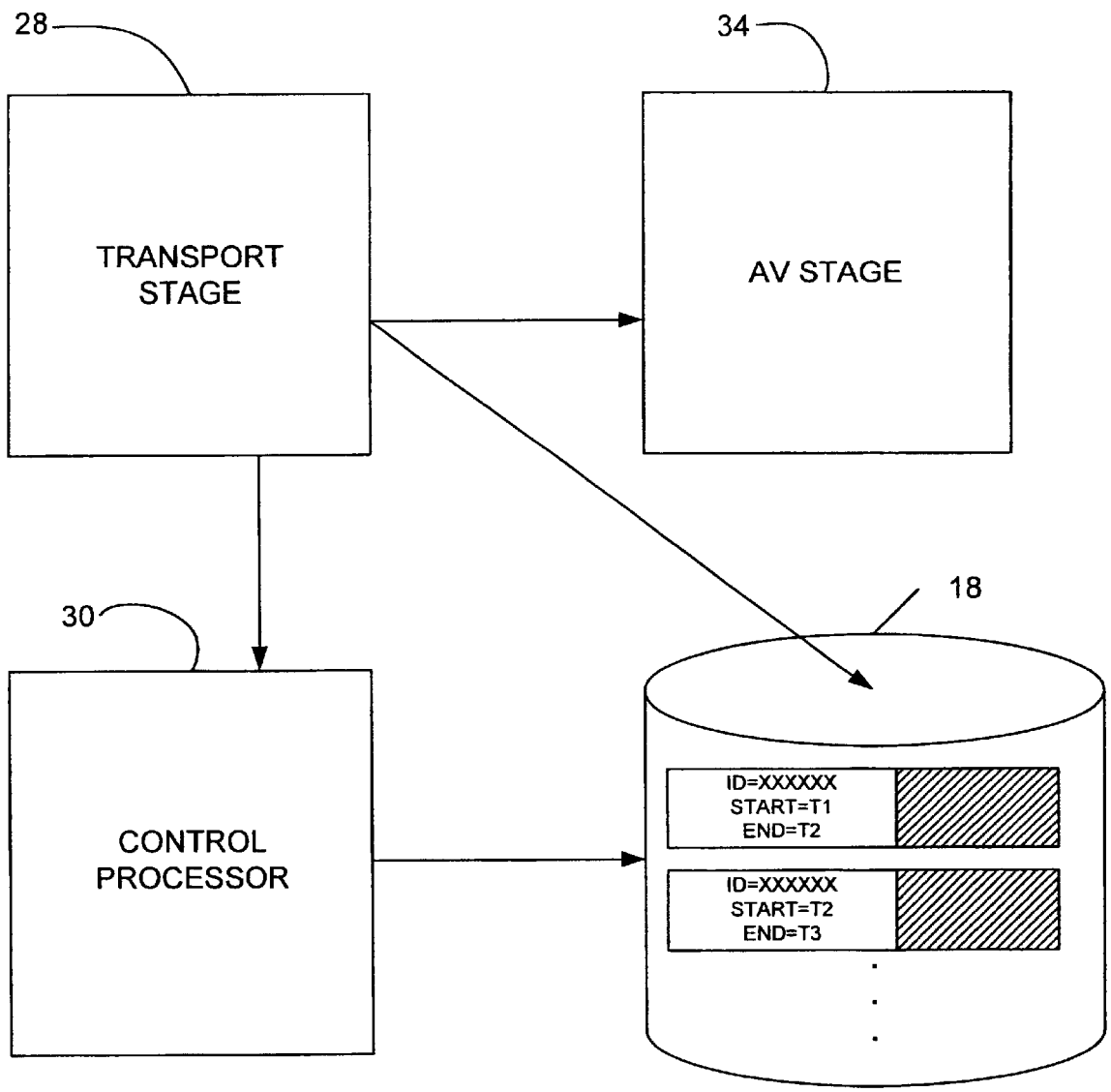
FIG. 3 is a block diagram illustrating the transfer of data to a storage device coupled to the set top box of FIG. 2.

FIG. 3 illustrates the transfer of data from the transport stage 28 to the storage device 18. The storage device 18 typically contains a plurality of programs which have been recorded by a viewer. The recordings are associated with identifying information that may have been copied or modified from the original signaling information. This identifying information may contain bookkeeping information similar to that typically stored in audio/video file systems or hierarchical computer file systems. The identifying information may have various formats and content, as long as it provides sufficient information to allow the viewer to uniquely retrieve a particular recorded viewing. As described below, the storage area may be defragmented periodically so that the programs may be stored in a contiguous manner. Direct memory access (DMA) is preferably used to send data from the transport stage 28 to the storage device 18. The data sent to the control processor 30 may include meta-data which describes the content of the audio-video data streams and may also include application programs and corresponding data that can be executed on the control processor's CPU in order to provide interactive television.

A copy of data sent from the transport stage 28 to the AV stage 34 is automatically sent to the storage device 18 at the beginning of the viewing, regardless of when the program started. The CPU in the control processor 30 configures a DMA controller to ensure that the data is written to a buffer that is allocated in the storage device 18. The number of minutes of viewing data to be recorded in the buffer is preferably selected by the viewer, however, the set top box 16 may be preset with a default value such as fifteen minutes. The control processor's CPU calculates the size of the buffer to allocate based upon the number of minutes and the maximum speed at which bits in the transport stream that the viewer is watching will be sent. This maximum speed may be obtained from meta-data sent with the audio-video stream. When the end of the buffer is reached, the CPU in the control processor is interrupted, at which time it will reconfigure the DMA controller to start writing at the beginning of the buffer. This design is known as a circular buffer.

The buffer is preferably circular to allow contiguous recording and writing over of previously recorded content. When the viewer changes the channel or a TV event (e.g., television program ends) occurs, the control processor's CPU will be interrupted. At this time, the CPU may allocate a new buffer or mark the beginning of the new event in the original buffer. The automatic recording of a program in temporary storage at the start of the program without any action by the viewer, allows the viewer to decide to record the program after the start of the program without losing any of the previously broadcast content. Once the viewer decides to record the program, the remainder of the program will be recorded in a semi-permanent storage area in the storage device 18, as described below.

Figure 4:
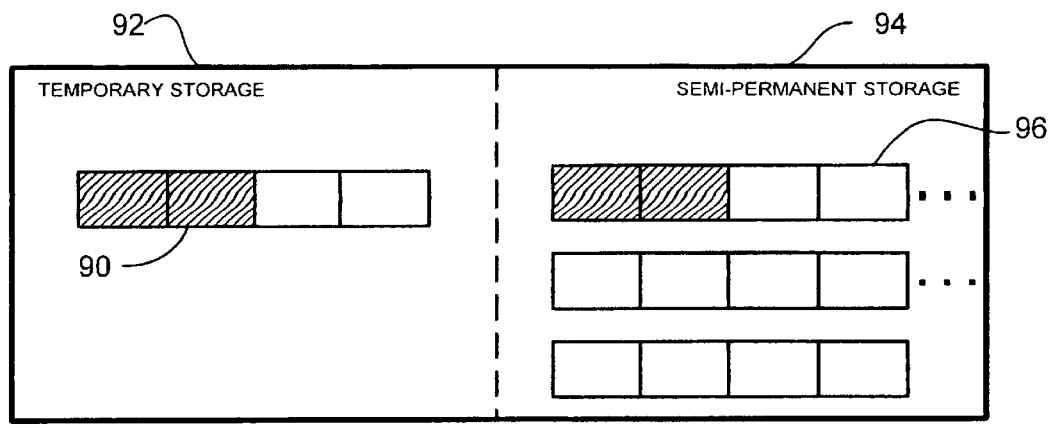
FIG. 4 is a diagram illustrating storage areas of the storage device of FIG. 3 with sufficient space available to store an entire program.
Figure 5:
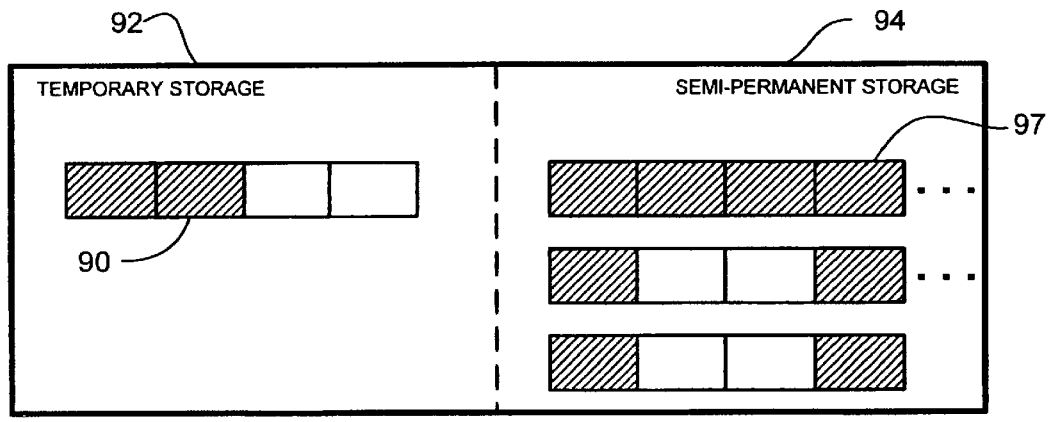
FIG. 5 is a diagram illustrating the storage areas shown in FIG. 4 with only enough space available to record a portion of the program.
Figure 6:
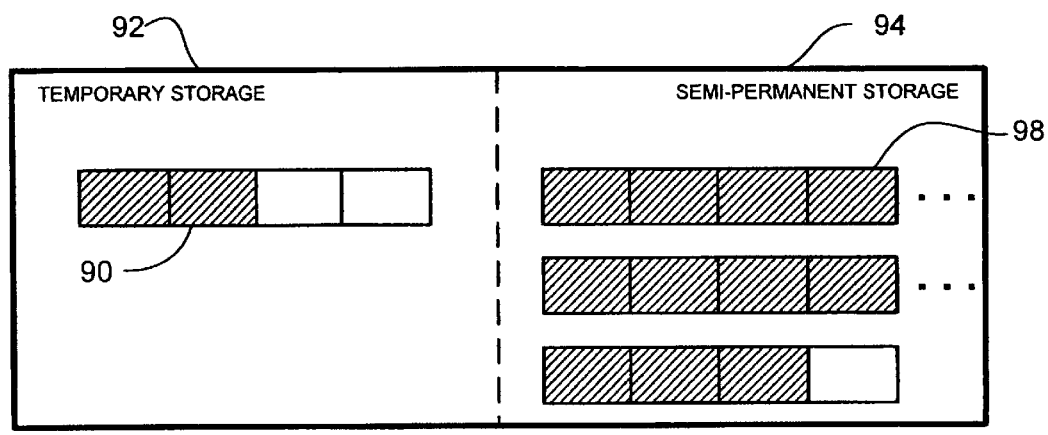
FIG. 6 is a diagram illustrating the storage areas shown in FIG. 4 with insufficient space to store an entire program.

FIGS. 4, 5, and 6 illustrate storage areas of the storage device 18. The storage device 18 may be divided into a temporary storage area (first storage area) 92 which contains the circular buffer 90 described above, and a semi-permnanent storage area (second storage area) 94 which is utilized to store complete program recordings or a portion of a program during the recording. It is to be understood that the storage media does not need to be physically divided, or even virtually divided into two components, as long as data structures reflect which parts of the media have been allocated and which have not. Thus, the first and second storage areas may be the same storage area.

As previously described, the control processor 30 automatically records the broadcast at a start of the program to store a first portion of the program in the circular buffer 90 within the temporary storage area 92 of the storage device 18. The program will continue to be recorded and stored within the buffer 90 for a predetermined period of time (e.g., 15 minutes). If a viewer decides to record the program after the start of the program, he will select a record option and the processor 30 will allocate space within the semi-permanent storage area 94 of the storage device 18. The processor 30 will then direct the audio-video stream to the allocated space within the semi-permanent storage area 94. After the recording is complete the first portion of the program, which was previously stored in the circular buffer 90, will be copied into the semi-permanent storage area, preferably in front of the allocated space within the semi-permanent storage 94. In this way, the first portion is physically combined with the second portion of the program to form a contiguous recording. Alternatively, the contents of the circular buffer may be copied to an altogether different area or the contents may remain in the buffer, with the buffer being, at least logically, re-mapped into the sem-permanent storage area, and a new circular buffer being allocated out of the temporary area or out of the semi-permanent area. The later may include updating a data structure that would be used to keep track of the temporary and semi-permanent divisions.

The joining of the first and second recorded portions in a common storage area may, thus, be implemented either physically or virtually. A physical implementation may include copying the first recorded portion to a location where the second portion has been recorded. A virtual implementation may include the modification of a data structure stored in the storage device. In either case, a viewer watching a replay of the entire recording should not be able to detect that the two parts of the recording were originally stored separately. Thus, the portions of the program may be physically contiguous or the portions of the program may be stored separately in a non-contiguous format as long as the entire recorded program can be played back in a continuous manner (i.e., viewer does not notice a transition between the playback of the first and second portions of the program).

It is to be understood that the first and second portions of the program may be initially stored in a common storage area such as the semi-permanent storage area 94, in which case the first and second storage areas will be the same. Also, the type of storage areas (e.g., temporary or semi-permanent) may be different than shown herein, without departing from the scope of the invention. Furthermore, it is to be understood that the identification of a storage area as "temporary" or "semi-permanent" may change overtime. For example, a circular buffer may initially be allocated to hold the first portion of the program and later the same memory may become semi-permanent storage because it is more efficient to map (i.e., indicate in a data structure) that this buffer is to semi-permanently contain the contents of the recording. Another buffer space would then be allocated for temporary storage.

Different levels and configurations of available storage space within the semi-permanent storage area 94 are shown in FIGS. 4–6. Shading within blocks of the storage media indicates space within the storage area that is full. FIG. 4 shows a temporary storage area 92 in which the circular buffer 90 is approximately fifty percent full and a semi-permanent storage area having a storage media 96 with only a small portion filled. FIG. 5 shows the semi-permanent storage area 94 having only small contiguous spaces remaining in the storage media 97. FIG. 6 shows the semi-permanent storage area 94 having a storage media 98 that is almost completely full. If there is insufficient contiguous space within the semi-permanent storage area 94 to record the entire program (as shown in FIG. 5), a defragmentation process may be performed to provide sufficient contiguous space. If the semi-permanent storage area 94 does not have sufficient space available even after defragmentation is performed (FIG. 6), the viewer may be notified and asked to delete previously recorded material or cancel the request to record the current broadcast program. Alternatively, there may be a default policy. Examples of such policies include removing the oldest recording or, if there is sufficient space for the second portion of the program without saving the portion of the program that was recorded in the first storage area, saving only the second portion of the program.

Figure 7:
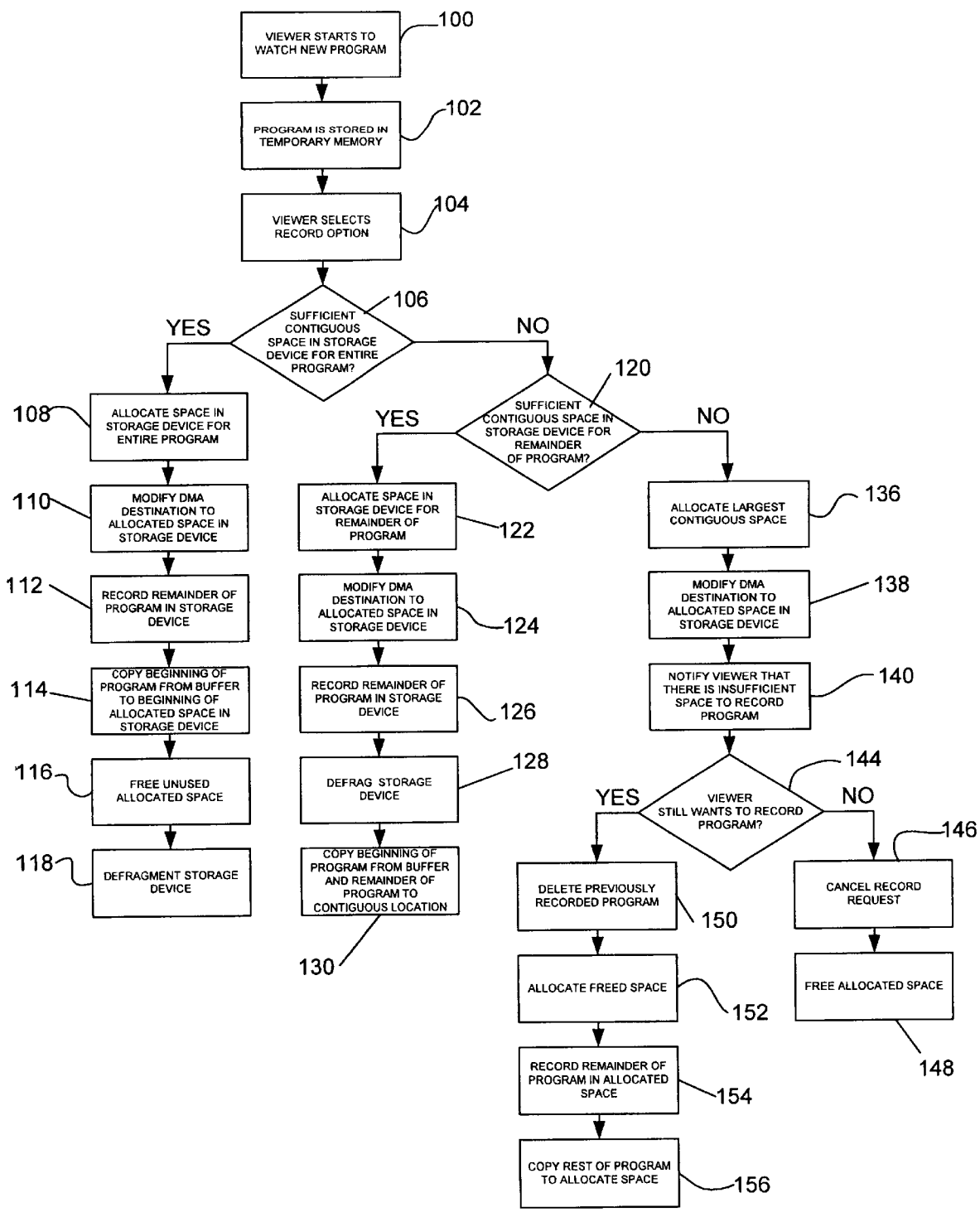
FIG. 7 is a flowchart illustrating a process for incorporating previously broadcast content into a program recording.

FIG. 7 is a flowchart illustrating an exemplary process for recording a program by a viewer after the program has already started. At step 100, the viewer begins to watch a new program on a selected channel on the television 20. The program is recorded in the circular buffer 90 in the first storage area 92 of the storage device 18 (step 102). Sometime during broadcast of the program, the viewer decides to record the program and presses a record button or selects a record option on a menu on the television screen, for example (step 104). The processor 30 first determines if there is sufficient contiguous space on the storage device 18 for the entire program, including the part currently stored in the buffer (step 106). If available, a space that is large enough to hold the entire program is allocated on the storage device 18 in the second storage area 94 (step 108). The processor registers the task of copying the current contents of the buffer 90 to the beginning of the newly allocated space. The DMA destination is modified to indicate the appropriate location in the newly allocated space to record the remainder of the requested program (step 110). The remaining part of the program is then stored in the storage device (step 112).

After recording of the program is complete, the contents of the buffer 90 are copied or mapped into the semi-permanent storage area 94 (step 114). The space occupied in the buffer 90 is then freed so that it can be used for future recordings (step 116). After the recording is completed, any unused portion of the allocated space is also freed (step 118). The unused space results from the fact that in order to allocate the original space, it is assumed that data is always sent at the maximum rate. The average rate, however, is often much less than the maximum rate. Thus, there is typically unused space remaining within the allocated space when the recording is complete. The processor 30 is preferably configured to periodically defragment the storage device 18 to reposition recordings on the media so that the remaining space is contiguous (step 118). An event manager may be used to register a copy or defragmentation task with an event booking mechanism as described in PCT Application No. PCT/IB99/01903, filed Nov. 9, 1999, by Pierre et al., which is incorporated herein by reference in its entirety.

If there is insufficient contiguous space on the storage device to store both the contents of the buffer 90 and the remainder of the program, but there is sufficient contiguous space to store the remainder of the program, space will be allocated to record the remainder of the program (steps 106, 120, and 122). The program is then recorded in the storage device (steps 124 and 126). The processor 30 then defragments the storage device 18 and copies both the contents of the buffer 90 and the remainder of the program into a contiguous location on the storage device (steps 128 and 130).

If there is insufficient contiguous space to record the remainder of the program, the viewer may be asked whether he wants to plug in a new storage device. If the viewer adds a new storage device, the software on the set top box sends the appropriate control commands to the software in the newly added device so that the entire program is placed on the media of the new storage device. If the viewer does not want to (or cannot) add a new memory storage device, the largest contiguous space on the storage device is first allocated to record what it can of the remainder of the program (steps 136 and 138). At the same time, a message is displayed to the viewer indicating that there is insufficient space to record the program currently being broadcast and the viewer is requested to choose between deleting an existing recording or not recording the current program (steps 140 and 144). If the viewer chooses not to record the program, the record request is cancelled and the space temporarily allocated to record the program is freed (steps 144, 146, and 148). If an existing recording is deleted, the freed space will be allocated, the remainder of the program recorded, and the portion stored in the buffer 90 copied to the allocated space (steps 150, 152, 154, and 156).

It is to be understood that the steps within the process or sequence of steps shown in FIG. 7 may be different than shown and described herein without departing from the scope of the invention. For example, if there is sufficient space in the storage device to record the remainder of the program, but not enough space to copy the first portion stored in the buffer, the viewer may be notified. Also, instead of requesting the viewer to choose to erase an existing recording if there is insufficient space available, a default policy may exist in the set top box 16, which specifies an action to take if there is insufficient space. Some of the steps described above may be performed concurrently or omitted (e.g., scheduling a defragmentation or reclaiming space).

As can be observed from the foregoing, the present invention has numerous advantages. A viewer is able to record not only the portion of the program broadcast after activating the recorder, but also the portion of the program broadcast before deciding to record the program. A viewer is also able to record a program after it has already started even if the recording device requires that the viewer manually modify it prior to recording the program. The viewer will have time to make these modifications while not losing the content being broadcast during and before the modification. Furthermore, the viewer is not required to take any action if they do not want to record a program they are watching. Only a small amount of space on the storage device is used to record the program the viewer is watching and this space is contiguously written over.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method in a television system for incorporating previously broadcast material into a recording, the method comprising:
   receiving a broadcast containing a program;
   automatically storing a first portion of the received program;
   receiving a request to record the program, wherein the request is received subsequent to storing the first portion;
   automatically determining whether sufficient space is available for storing the program, wherein said determining is based at least in part on data included in the broadcast which indicates a duration of said program; and
   storing a second portion of the program in response to receiving the request and determining sufficient space is available for storing the program.

2. The method as recited in claim 1, wherein the method further comprises storing a data structure which identifies the program.

3. The method as recited in claim 2, wherein the first portion and the second portion are stored in non-contiguous locations, the data structure identifies the respective locations of the non-contiguous first and second portions, and wherein the method further comprises playing the non-contiguously stored first and second portions as a single continuous stream.

4. The method as recited in claim 3, wherein playing the stream comprises accessing the stored data structure to identify the locations of the first and second portions.

5. The method as recited in claim 1, wherein in response to determining said sufficient space is not available, the method further comprises:
   automatically de-fragmenting a plurality of non-contiguous locations to form a single contiguous location sufficient in size to store the program; and
   storing the program in the contiguous location.

6. The method as recited in claim 5, wherein the method further comprises storing a data structure which identifies the program and the location of said contiguous location.

7. The method as recited in claim 1, wherein in response to determining said sufficient space is not available on a storage device, said method further comprises automatically deleting a previously stored program from the storage device in order to create said sufficient space.

8. The method as recited in claim 7, wherein said previously stored program comprises an oldest recording on the storage device.

9. The method as recited in claim 1, wherein said determining comprises:
   detecting meta-data in said broadcast, wherein said meta-data is indicative of a maximum bit rate corresponding to the program; and
   utilizing said maximum bit rate to calculate a minimum number of bits of storage required to store the program.

10. The method as recited in claim 9, wherein the average bit rate of the program is less than said maximum bit rate, and wherein the method further comprises freeing storage which was allocated for storage of the program but remains unused subsequent to storing the program.

11. A receiving device for recording a program comprising:
   a receiver configured to receive a broadcast containing said program;
   a storage device; and
   a processor configured to:
      automatically store a first portion of the received program;
      receive a request to record the program, wherein the request is received subsequent to storing the first portion;
      automatically determine whether sufficient space is available on said storage device for storing the program, wherein said determining is based at least in part on data included in the broadcast which indicates a duration of said program; and
      store a second portion of the program in response to receiving the request and determining sufficient space is available for storing the program.

12. The receiving device as recited in claim 11, wherein the processor is further configured to store a data structure which identifies the program.

13. The receiving device as recited in claim 12, wherein the first portion and the second portion are stored in non-contiguous locations on the storage device, the data structure identifies the respective locations of the non-contiguous first and second portions, and wherein the processor is further configured to initiate playback of the non-contiguously stored first and second portions as a single continuous stream.

14. The receiving device as recited in claim 13, wherein the processor is configured to access the stored data structure to identify the locations of the first and second portions for retrieval and playback.

15. The receiving device as recited in claim 11, wherein in response to determining said sufficient space is not available, the processor is further configured to:

automatically initiate de-fragmenting of a plurality of non-contiguous locations on the storage device to form a single contiguous location sufficient in size to store the program; and store the program in the contiguous location.

16. The receiving device as recited in claim 15, wherein the processor is further configured to store a data structure which identifies the program and the location of said contiguous location.

17. The receiving device as recited in claim 11, wherein in response to determining said sufficient space is not available on the storage device, said processor is further configured to automatically delete a previously stored program from the storage device in order to create said sufficient space.

18. The receiving device as recited in claim 17, wherein said previously stored program comprises an oldest recording on the storage device.

19. The receiving device as recited in claim 11, wherein in determining whether sufficient space is available, said processor is configured to:

detect meta-data in said broadcast, wherein said meta-data is indicative of a maximum bit rate corresponding to the program; and utilize said maximum bit rate to calculate a minimum number of bits of storage required to store the program.

20. The receiving device as recited in claim 19, wherein the average bit rate of the program is less than said maximum bit rate, and wherein the processor is further configured to free storage which was allocated for storage of the program but remains unused subsequent to storing the program.

21. The receiving device as recited in claim 11, wherein said broadcast is conveyed from a head-end.

22. A method in a television system for incorporating previously broadcast material into a recording, the method comprising:

receiving a broadcast containing a program;

automatically storing a first portion of the received program;

receiving a request to record the program, wherein the request is received subsequent to storing the first portion;

automatically determining whether sufficient space is available for storing the program, wherein said determining is based at least in part on data included in the broadcast which indicates a maximum bit rate of said program; and storing a second portion of the program in response to receiving the request and determining sufficient space is available for storing the program.

23. A receiving device for recording a program comprising:

a receiver configured to receive a broadcast containing said program;

a storage device; and a processor configured to:

automatically store a first portion of the received program;

receive a request to record the program, wherein the request is received subsequent to storing the first portion;

automatically determine whether sufficient space is available on said storage device for storing the program, wherein said determining is based at least in part on data included in the broadcast which indicates a maximum bit rate of said program; and store a second portion of the program in response to receiving the request and determining sufficient space is available for storing the program.

* * * * *